(12) United States Patent
Mody et al.

(10) Patent No.: US 9,277,411 B2
(45) Date of Patent: Mar. 1, 2016

(54) METHOD AND SYSTEM TO MAKE CURRENT WIRELESS RADIOS COGNITIVE USING AN EXTERNAL SENSOR AND APPLICATION LEVEL MESSAGING

(75) Inventors: Apurva N. Mody, Chelmsford, MA (US); Matthew J. Sherman, Succasunna, NJ (US); Kwok N. Yau, New York, NY (US); Alan Trojan, Wayne, NJ (US); Sharon K. Sputz, Teaneck, NJ (US); Joseph Farkas, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 116 days.

(21) Appl. No.: 13/320,416

(22) PCT Filed: Mar. 11, 2011

(86) PCT No.: PCT/US2011/028057
§ 371 (c)(1),
(2), (4) Date: Nov. 14, 2011

(87) PCT Pub. No.: WO2011/156029
PCT Pub. Date: Dec. 15, 2011

(65) Prior Publication Data
US 2012/0142386 A1    Jun. 7, 2012

Related U.S. Application Data

(60) Provisional application No. 61/313,377, filed on Mar. 12, 2010.

(51) Int. Cl.
*H04W 16/14*   (2009.01)
*H04W 72/08*   (2009.01)

(52) U.S. Cl.
CPC ............ *H04W 16/14* (2013.01); *H04W 72/082* (2013.01)

(58) Field of Classification Search
CPC ........................... H04W 16/14; H04W 72/082
USPC ............................................................ 455/62
See application file for complete search history.

(56) References Cited

U.S. PATENT DOCUMENTS

| | | | |
|---|---|---|---|
| 5,963,848 A * | 10/1999 | D'Avello | ........................ 455/62 |
| 2002/0123345 A1* | 9/2002 | Mahany et al. | ............... 455/432 |
| 2004/0047324 A1 | 3/2004 | Diener | |
| 2007/0207751 A1 | 9/2007 | Behzad et al. | |

(Continued)

*Primary Examiner* — David Bilodeau
(74) *Attorney, Agent, or Firm* — Sand & Sebolt; Daniel J. Long (57) ABSTRACT

A system and method for converting a non-cognitive radio into a cognitive radio is presented. A cognitive radio system includes, a non-cognitive radio; an electronic device, a spectrum sensing logic and configuration and management logic. The electronic device is connected to the non-cognitive radio so that it receives and/or transmits messages to/from a wireless network. The configuration and management logic is connected between the non-cognitive radio and the spectrum sensing logic. The spectrum sensing logic and the configuration and management logic are removable from the non-cognitive radio allowing the cognitive radio to operate in a non-cognitive mode. The spectrum sensing logic senses a wireless environment to determine available frequencies and available channels. The configuration and management logic transmits available frequencies, available channels or other spectrum data to a remote spectrum manager that is managing access to the wireless network.

10 Claims, 9 Drawing Sheets

(56) References Cited

U.S. PATENT DOCUMENTS

| | | |
|---|---|---|
| 2008/0165754 A1 | 7/2008 | Hu |
| 2009/0061889 A1 | 3/2009 | Ayoub et al. |
| 2010/0069013 A1* | 3/2010 | Chaudhri et al. .......... 455/67.11 |
| 2010/0195590 A1* | 8/2010 | Park .............................. 370/329 |
| 2010/0238868 A1* | 9/2010 | Melpignano et al. ......... 370/329 |
| 2012/0058794 A1* | 3/2012 | Valentine ...................... 455/513 |

\* cited by examiner

METHOD AND SYSTEM TO MAKE CURRENT WIRELESS RADIOS COGNITIVE USING AN EXTERNAL SENSOR AND APPLICATION LEVEL MESSAGING

STATEMENT OF GOVERNMENT INTEREST

The invention was made with United States Government support under Contract No. W15P7T-06-C-P423 awarded by the United States Army. The United States Government has certain rights in this invention.

BACKGROUND OF THE INVENTION

1. Field of Invention

The current invention relates generally to apparatus, systems and methods for wireless communication. More particularly, the apparatus, systems and methods relate to protecting wireless communication networks from dynamic interference. Specifically, the apparatus, systems and methods provide for protecting wireless networks with cognitive radios that dynamically analyzing a spectrum of communication frequencies.

2. Description of Related Art

Conventional military and commercial wireless communications networks are vulnerable to dynamic interference environment. Interference may come from adversaries or other friendly systems. Today's wireless networks also need to protect the incumbent systems which may already be operating on the given frequency bands. Hence they need to detect the presence of these legitimate incumbent systems and vacate the spectrum if required. Previous wireless networks often do not have the intelligence to autonomously move to other un-occupied frequency bands or alter their bandwidth. Large amount of resources have already been invested by the military and many commercial operators in building these radio systems which are currently not dynamic spectrum access (DSA) enabled. In order to make the current military radios cognitive, it will require more investment from the Department of Defense (DoD) and commercial carriers.

In more detail, it is generally believed that there is ample radio frequency (RF) spectrum available to meet the global demand for voice, video and data. For instance, based on measurements of the average spectrum usage in multiple different markets, it has been found that more than 80% of the available spectrum is under-utilized. Most of the current spectrum has been allocated using a command and control licensing structure where a few selected entities are in charge of large swaths of spectrum, many of which are underutilized. The most relevant example is that of broadcast television (TV) spectrum where signals are normally transmitted over the air at VHF and UHF frequencies. In rural markets TV channels often go unused due to limited demand. In urban markets, the majority of people have started receiving their TV transmission either using cable or optical fiber. Many countries are making transition towards Digital TV (DTV) where signals occupy much smaller bandwidths as compared to their analog counterparts. These factors lead to large and increasing amounts of spectrum that are allocated to broadcast services, but are locally unused. This vacant spectrum may be opportunistically accessed to transmit broadband data in case it can be established that such a use causes no harmful interference to the allocated (incumbent) broadcast services.

Technology already exists to allow opportunistic usage of RF spectrum. Such opportunistic use of spectrum is often called dynamic spectrum access (DSA). Programs such as the neXt Generation (XG) Communications have proven that DSA techniques can allow access to channels allocated to incumbent users without harmful interference to the incumbent. The concept of cognitive radio also seems to be feasible. Cognitive radios are defined as radios that are capable of sensing their surrounding environment and altering their transmission parameters to more optimally utilize the existing resources, such as RF spectrum, to meet current user needs. Some have even proposed combining DSA techniques with machine learning techniques to make better usage of the system resources while avoiding interference. Other cognitive radio concepts are discussed in: U.S. Patent Publication No. 2008/0293353 (Mody et al.), U.S. Patent Publication No. 2009/0102981 (Mody), U.S. Patent Publication No. 2009/0124207 (Mody et al.), and Apurva N. Mody, Stephen R. Blatt, Ned B. Thammakhoune, Thomas P. McElwain, Joshua D. Niedzwiecki, Diane G. Mills, Matthew J. Sherman and Cory S. Myers, "Machine Learning Based Cognitive Communications In White As Well As The Gray Space," Military Communications Conference, 2007. MILCOM 2007. IEEE, pp. 1-7.

The future points to multitudes of such DSA enabled cognitive radio devices using a variety of different waveforms and protocols, co-existing, in cognitive networks to make the best possible use of the available spectrum. The word co-existence here is of importance since competing technologies will result in different types of waveforms and protocols being employed for various types of services. These diverse waveforms and protocols will need to share spectral resources without harming each other, hence the need for co-existence. Some of the Institute of Electrical and Electronics Engineers (IEEE) standards working groups such as IEEE 802.15.2 have defined the term co-existence as the "ability of one system to perform a task in a given shared environment where other systems have an ability to perform their tasks and may or may not be using the same set of rules."

The IEEE 802.22 standard is directed to wireless regional area networks (WRANs) that use white spaces (unused bandwidth) in the television broadcasting bands without interfering with other users. The standard is largely based on concepts underpinning the cognitive radio, which include spectrum sensing and management as well as spectrum mobility and sharing. Spectrum sensing and management generally involve the detection of the best spectrum to meet user quality of service (QoS) requirements and using it without harmful interference to other users. Spectrum mobility and sharing allow for maintaining seamless communications when transitioning from one spectrum to another (e.g., dynamic frequency selection, frequency hopping, etc), and strive for fairness in spectrum allocation (e.g., equal access).

To this end, cognitive radios and networks sharing common bandwidth have to effectively self-coexist with one another by accessing different parts of the available spectrum in an evenly or otherwise fairly distributed manner. Executing such self-coexistence is not trivial, and there are currently no available methods for resource allocation during situations requiring co-existence in cognitive radios. Moreover, conventional co-existence techniques require changes in the concept of communication system operation, thereby resulting in legacy systems not being inter-operable with systems requiring co-existence.

SUMMARY OF THE INVENTION

The preferred embodiment includes a cognitive radio system. The cognitive radio system includes, a non-cognitive radio, an electronic device, a spectrum sensing logic and a configuration and management logic. The electronic device is connected to the non-cognitive radio so that it receives and/or transmits messages to/from a wireless network. The configuration and management logic is connected between the non-cognitive radio and the spectrum sensing logic. When operating as a cognitive radio, the spectrum sensing logic and the configuration and management logic are removable from the non-cognitive radio allowing the cognitive radio to operate in a non-cognitive mode. The spectrum sensing logic senses a wireless environment to determine available frequencies and available channels. The configuration and management logic transmits available frequencies, available channels or other spectrum data to a remote spectrum manager that is managing access to the wireless network.

In other configurations of the preferred embodiment, the configuration and management logic sends messages to and from the remote spectrum manager in the application level of the Open Systems Interconnection (ISO) 7-layer model. The messages can be sent in the application layer through a logical connection established with internet protocol (IP) addressing.

In another configuration, a switch can be connected between the non-cognitive radio and the electronic device and between the non-cognitive radio and the configuration and management logic. The switch can be used to route messaging between these devices. The configuration and management can include mode logic. The mode logic determines when to place the cognitive radio system in an autonomous mode and when to place the cognitive radio system in a client/server mode with the cognitive radio system acting as a client to the remote spectrum manager acting as a server. In the autonomous mode, the configuration and management logic scans a specified frequency range and provides periodic reports about at least one of the group of spectral density, available frequencies and available channels to the spectrum manager.

In another configuration of the preferred embodiment, the cognitive radio system can include a display. The display can be generated by the configuration and management logic and can display channels available, channels not available, channel spectral characteristics, signal classification results and/or parameter settings for the spectrum sensing logic. The display can be displayed on the electronic device attached to the non-cognitive radio. In some configurations, the electronic device is a laptop.

In another configuration of the preferred embodiment, the cognitive radio includes an antenna for capturing wireless signals and a Low Noise pre-Amplifier (LNA) connected between the antenna and the spectrum sensing logic. The LNA reduces the effective Noise Figure (NF) of the signal before inputting the signals into the spectrum sensing logic.

Another configuration of the preferred embodiment is a method of converting a non-cognitive radio in a cognitive radio. The method connects a spectrum sensor between a configuration and management unit and an antenna. The spectrum sensor senses a wireless environment to determine available frequencies and/or available channels. The method connects the configuration and management unit to a non-cognitive radio. The configuration and management unit transmits the available frequencies and/or available channels to a remote spectrum manager that is managing access to a wireless network. The configuration and management unit can communicate with a remote spectrum manager in the application level of the ISO model using TCP/IP packets for information exchange. The method can operate the cognitive radio according to the International Electrical and Electronic Engineers Institute (IEEE) 802.22 standard. The spectrum sensor and the configuration and management unit are removable from the non-cognitive radio.

The method can perform additional steps and/or have other useful features. For example, the method can connect an electronic device to the non-cognitive radio to allow the electronic device to transmit and receive message over the wireless network. The method can remove the antenna, spectrum sensor and configuration and management unit from the non-cognitive radio to allow the system to operate as a non-cognitive radio. The method can use a graphical user interface (GUI) to display spectral data collected from the spectrum analyzer. The method can also accept and apply operating settings for the spectrum sensor through the GUI.

In another configuration, one may or may not have a sensor attached to each configuration and management unit.

In another configuration, the Spectrum Manger may reside at the Control Node or the Base Station in the network.

In another configuration, the Spectrum Manager may reside outside the network on a server and may also function as a Network Manager.

In another configuration the Spectrum Manager may reside on all the subscriber nodes.

In another configuration, the Spectrum Manager may have an IP address associated with it.

In another configuration, all the software components such as the Spectrum Manager, the Configuration and Management, the spectrum sensing routines may have IP address associated with them.

In another configuration all the nodes in the network may contain a Configuration and Management unit.

In another configuration all the nodes in the network may contain a Spectrum Manager.

In another configuration a sensing antenna may be different from the radio antenna.

In another configuration, both the sensor and the radio can share the antenna.

In another configuration the system topology may be Point to Multipoint.

In another configuration, the system topology may be ad-hoc mesh.

In another configuration, spectrum sensing is used to detect interference in-band as well as out of band; where in-band refers to the current operating channel of the radios and out-of-band refers to any channels where the radio is not operating currently.

In another configuration, radio statistics are used to monitor the interference in-band and sensing is used to find the backup channels out-of-band.

In another configuration, the sensor may operate during synchronized quiet periods.

In another configuration, the sensor does sensing without synchronized quiet periods.

In another configuration, the sensor operates without any quiet periods.

In another configuration, the method can operate the spectrum sensor so that it can determine at least one spectrum characteristic based on higher order statistics (HOS) of the spectrum and/or cyclostationary features of the spectrum.

Other configurations of the preferred embodiment provide for methods and systems to convert current military radios into DSA capable radios without requiring hardware or firmware modifications to the radios. This configuration also provides early evaluation of cognitive networking at the system level to measure parameters such as the messaging overhead, latency, network scalability, and the like. Radios can be made DSA capable by using an external sensor as compared to an embedded sensor, to monitor the radio frequency spectrum for interference to determine backup channels the radios can move to. Advanced feature based sensing algorithms can be used to characterize the dynamic interference environment.

It has been determined that it is possible to demonstrate cognitive networking capability without having a sensor at every node. In one configuration, application level messaging can be enabled through IP and SNMP for spectrum monitoring, network management and radio control. The cognitive engine which is also called the Spectrum Manager (SM), can written in a high level language such as JAVA which makes it easily modifiable. This configuration greatly enhances the network intelligence by feeding spectrum information to NetOps for higher level de-confliction of spectrum.

BRIEF DESCRIPTION OF SEVERAL VIEWS OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Similar numbers refer to similar parts throughout the drawings.

DETAILED DESCRIPTION

Before introducing the details of the preferred embodiment of the invention, an introduction to the Electrical and Electronic Engineers Institute (IEEE) 802.22 standard is presented. This standard is associated with wireless remote area networks (WRAN) that employ cognitive radios (CGs) to which the preferred embodiment of the invention is associated with.

Figure 1:
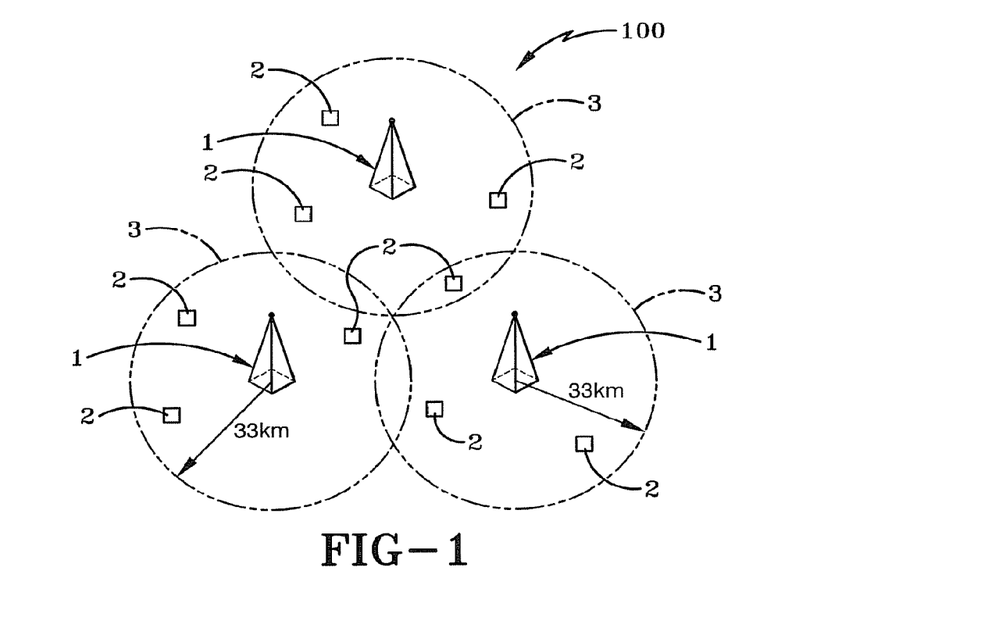
FIG. 1 illustrates an example embodiment of a wireless regional area network (WRAN) implemented with cognitive radios (CRs).

The 802.22 system 100 specifies a fixed point-to-multipoint (P-MP) wireless air interface whereby a base station (BS) 1 manages its own cell 3 and associated consumer premise equipments (CPEs) 2, as illustrated in FIG. 1. In a commercial environment, the BS 1 is a professionally installed entity such as a cellular tower. The BSs 1 and CPEs 2 form a master slave type of relationship with the BSs controlling the medium access in their cells by transmitting in a downstream direction to the various CPEs 2. The CPEs 2 can freely transmit within a cell after given authorization to do so by its BS 1. An 802.22 cell 3 (or simply, a cell) is generally defined as being formed by a single 802.22 BS 1 and zero or more 802.22 CPEs 2 associated with and under control by this 802.22 B1, whose coverage area extends up to the point where the transmitted signal from the 802.22 BS 1 can be received by associated 802.22 CPEs 2 with a given minimum signal to noise ratio (SNR) of signal quality.

In addition to the traditional role of a BS 1, in an 802.22 system 100 a BS also manages a unique feature of distributed sensing. This is needed to ensure proper incumbent protection and is managed by the BS1, which instructs the various CPEs 2 to perform distributed measurement of different communication channels to determine if and when the channels are busy. Based on the feedback received, the BS 1 decides which steps, if any, are to be taken.

Figure 2:
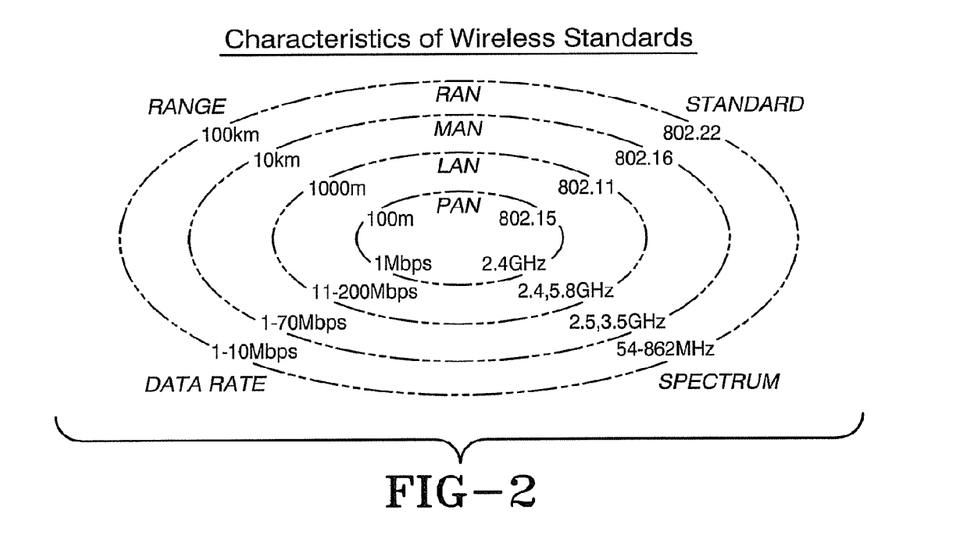
FIG. 2 illustrates characteristics of different wireless network standards.

Another distinctive feature of a 802.22 WRAN as compared to other existing IEEE 802 standards is the BS coverage range, which can go up to 100 Km if power is not an issue (current specified coverage range is 33 Km at 4 Watts Equivalent isotropically radiated power EIRP). As shown in FIG. 2, WRANs have a much larger coverage range than traditional networks, which is primarily due to its higher power and the favorable propagation characteristics of TV frequency bands. This enhanced coverage range offers unique technical challenges as well as opportunities.

Figure 3:
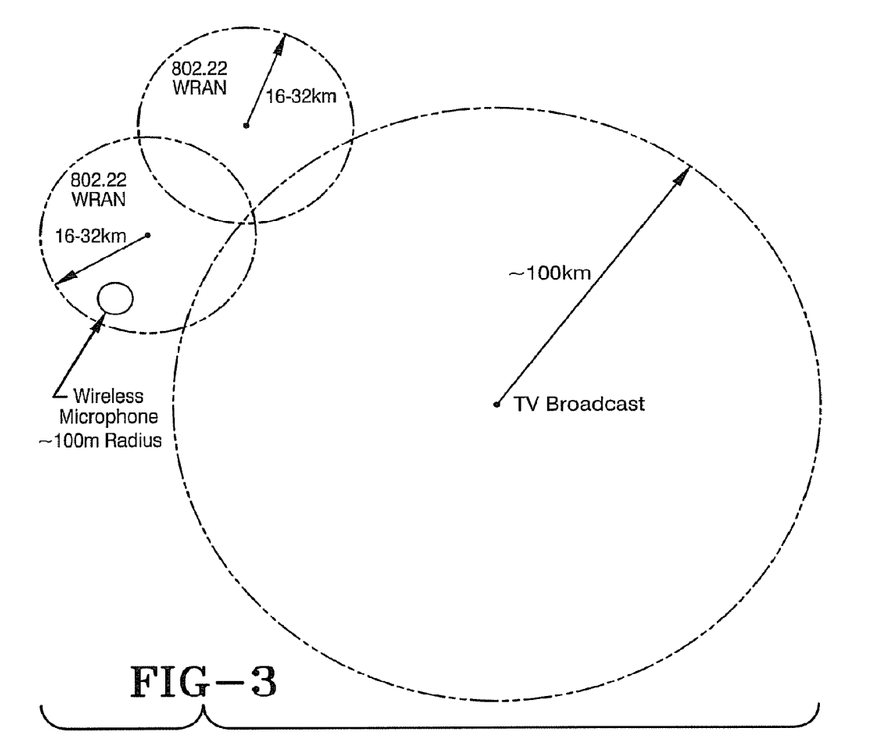
FIG. 3 illustrates IEEE 802.22 compliant radios in coexistence with incumbent radios.

One important requirement for the 802.22 air interface is flexibility and adaptability, which stem from the fact that 802.22 operates in a spectrum where incumbent device have to be protected. Because an 802.22 system can operation is unlicensed and a BS serves a large area, self-coexistence amongst collocated 802.22 cells between the overlapping 802.22 networks as shown in FIG. 1 is of paramount importance as well as the coexistence with incumbents as shown if FIG. 3. The coexistence with the incumbents is achieved by accurate and fast spectrum sensing, measurements, detection algorithms, and spectrum management, which is performed by the CPEs and the BS. So the flexibility and adaptability becomes very high with these techniques. The PHY unit and medium-access controller (MAC) are designed to support this flexibility and adaptability to handle the coexistence issues.

Figure 4:
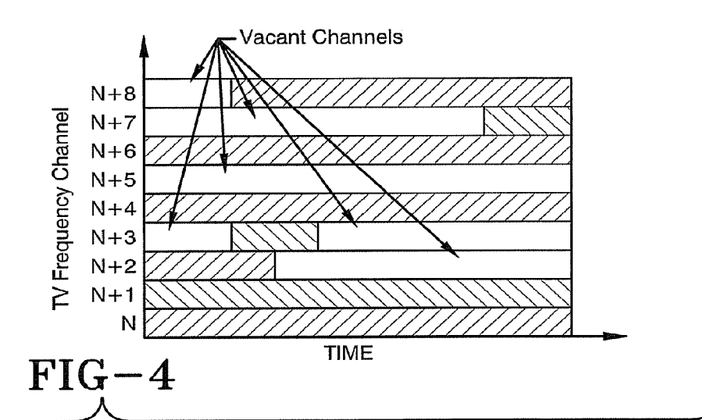
FIG. 4 illustrates an example pattern of channel incumbents with respect to time and frequency.

FIG. 4 illustrates an example pattern of channel occupancy by incumbents with respect to time and frequency. As seen in this figure, transmission opportunities (i.e., time during which a channel is vacant) by CPEs often experience a random behavior which impacts the design of both MAC and PHY. WRAN applications require flexibility on the downstream with support for variable number of users with possibly variable throughput. WRANs also need to support multiple access on the upstream. Multi-carrier modulation techniques are very flexible in this regard, as they enable control of both signal time and frequency domains. This provides an opportunity to define two-dimensional (time and frequency) slots and to map the services to be transmitted in both directions onto a subset of these slots. The current 802.22 draft is based on OFDMA modulation for downstream and upstream links with some technological improvements such as channel bonding. WRAN are characterized with generally long delay spreads (25 us and up to 50 us in large terrain or metropolitan areas). This may require the use of a cyclic prefix on the order of 40 us. In order to reduce the impact of the overhead due to cyclic prefix, approximately 2K carriers can be used in one channel.

The 802.22 PHY should also provide high flexibility in terms of modulation and coding. For example, consider the scenario in FIG. 1 where CPEs may be located at various distances from the BS and hence experience different Signal-to-Noise Ratio (SNR) quality. To overcome this issue and improve system efficiency, the BS should be capable of dynamically adjusting the bandwidth, modulation and coding on, at least, a per CPE basis. OFDMA is a good fit to meet these targets because it allows efficient allocation of sub carriers to match the requirements of the CPEs. A person of ordinary skill in the art will understand that the subscribers may be divided into 48 subchannels and modulation schemes such as QPSK, 16-QAM, 64QAM with convolution coding can be used. This provides for a data rate starting from a few Kbps per sub channel up to 19 Mbps per channel which should provide sufficient flexibility.

It is well known by those of ordinary skill in the art, that wider bandwidth decreases frequency-non-selective flat fading and provides more frequency diversity in a frequency selective fading channel environment. In addition, wider bandwidth provides more capacity. Thus, whenever spectrum is available, it is beneficial to use wider bandwidth system. Such available wider spectrum can be used to tradeoff data-rate with distance. For example, those devices that are closer to the BS can enjoy high capacity while the ones that are far away can benefit from the multi-path diversity and from more transmitted and received power. Preliminary link budget analysis has shown that it would be difficult to meet the 802.22 requirements (about 19 Mbps at 30 Km) by using just 1 TV channel for transmission. The use of channel bonding by aggregating contiguous channels allows this requirement to be met. There are two channel bonding schemes: bonding of contiguous and non-contiguous channels. The current 802.22 draft supports both these schemes.

Figure 5:
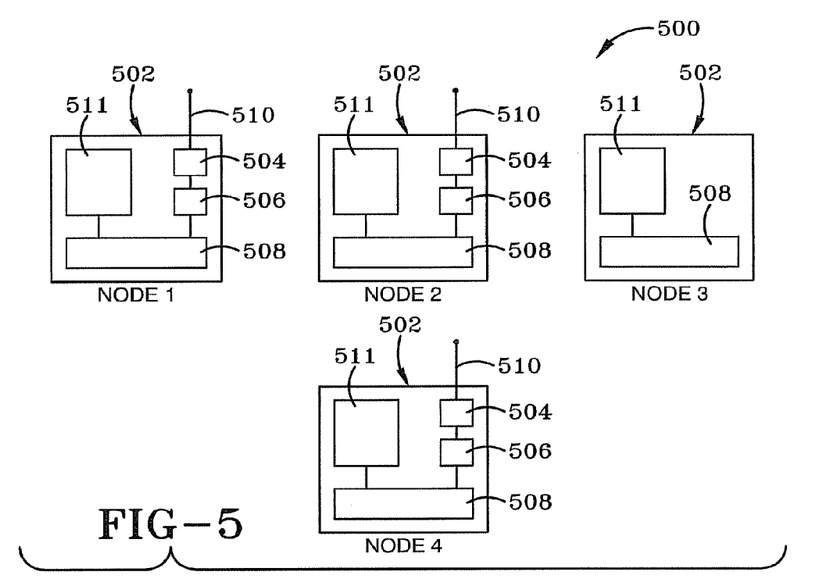
FIG. 5 illustrates the preferred embodiment of a cognitive radio system.

FIG. 5 illustrates the preferred embodiment of the invention configured as a system 500 of CRs 502. The CRs 502 of this system represents four different nodes 1-4 of a wireless network. Each CR 502 of this system 500 contains a non-DSA radio 508 as well as configuration and monitoring (C&M) logic 506. Three of the nodes 1, 2 and 4 also contain spectrum sensing logic 504 associated with an antenna 510. The nodes 1-4 may optionally also contain one or more computers 511 (e.g., laptops) connected to the non-cognitive radio 508.

"Logic", as used herein, includes but is not limited to hardware, firmware, instructions stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include at least one circuit, one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics The spectrum sensing logic 504 monitors frequency data captured by its antenna 510 and reports which channels and/or frequencies are free or busy to the configuration and monitoring logic 506. The configuration and monitoring (C&M) logic 506 reports this information to one of the nodes 1-4 acting as a spectrum manager (SM). The spectrum sensing logic 504 and the configuration and monitoring logic 506 can perform other cognitive radio functions such as those described in the 802.22 standards. In FIG. 5, the configuration and monitoring logic 506 of node 4 may be acting as the SM. In one configuration of the system 500, other nodes 1-3 not acting as the SM report to and are controlled by the SM in a master-slave relationship.

The SM can act as the cognitive engine of the system 500. It monitors the radio link statistics and the spectrum sensing information from each of the nodes 1-4 to make a decision on whether a change in frequency bandwidth (BW) or power for the radio network are required. In some configurations of the preferred embodiment, a laptop attached to the non-DSA radio 506 may replace all or a portion of the configuration and monitoring logic 506 so that the cognitive functions normally performed in the configuration and monitoring logic 506 can be performed in the laptop. Additionally, one laptop can act as the SM of the network 512. The SM may reside in any of the nodes 1-4, since it has a dedicated IP address associated with it, but in a Point to Multi-Point (PMP) network topology, the SM is likely to reside in the Control Node (CN).

In one configuration of the preferred embodiment, one or more the modules can be assigned a dedicated Internet protocol (IP) address. This allows these modules to be accessed and configured using IP/simple network management protocol (SNMP) application level messages. Using IP as a backbone allows the system 500 to easily accommodate disparate radio networks and enables network scalability allowing seamless increase in the number of nodes 502 within the network. Usage of IP and SNMP messaging at the application level to monitor and control the radios 502 means that there may be no changes required to the hardware or firmware of the noncognitive radios 508. In fact, there may not be any changes required to the software (e.g., MAC) messaging of the non-cognitive radios 508.

Unlike a conventional wireless system, the system 500 of FIG. 5 uses application level messaging for information exchange, system monitoring and control which results in some additional overheads due to IP encapsulation requirements. However, as demonstrated later, these overheads are insignificant when compared to the actual information throughput of the system 500.

Figure 6:
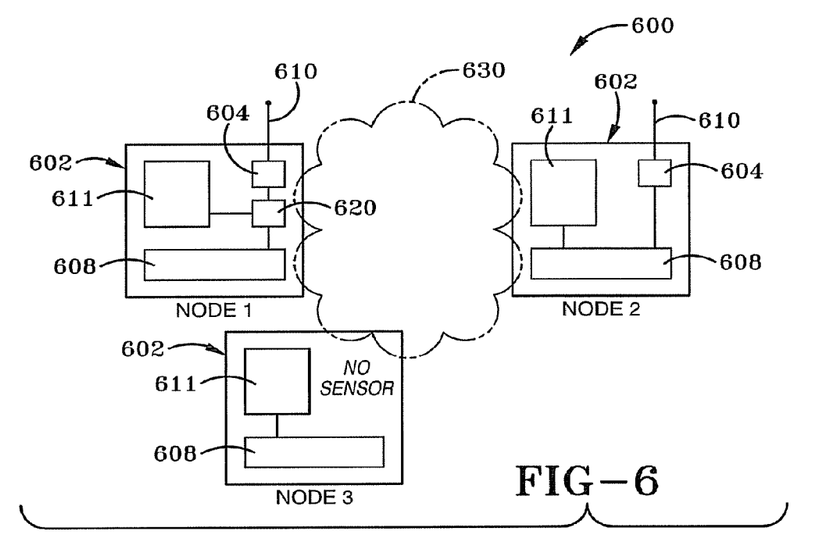
FIG. 6 illustrates another configuration of the preferred embodiment of a cognitive radio system.

BAE System Inc. has tested the system 500 of FIG. 5 in a configuration knows as Agile Spectrum Utilization for Robustness and Efficiency (ASURE) that is illustrated in FIG. 6. The example system 600 of FIG. 6 includes 3 nodes 1-3 that are connected together through a network 630. In the ASURE system, each node 602 consists a software controllable non-DSA radio 608, which had the necessary interfaces that allows it to be configured, a radio frequency (RF) collector 604 (e.g., spectrum sensing logic 504 of FIG. 5), and a laptop 611. A network layer switch may 620 connect the radio 608, the laptop 611 and the RF collector 604. The collector 604 can be attached to an antenna 610. The laptop 611 contains the spectrum sensing, C&M, and the SM cognitive engine algorithms. FIG. 6 shows the test-bed with three nodes, in a PMP configuration. The network scalability and the network topology (e.g., PMP in this case) are decided by the capabilities of the radios 608, and are neither limited by the ASURE system architecture nor the cognitive radio algorithms that are utilized. The ASURE system 600 uses the radio links themselves for cognitive radio network monitoring and control. No separate backup link is required.

In the ASURE system 600 of FIG. 6, Warfighter Information Network-Tactical (WIN-T) Local Area Waveform (LAW) radios were used for the ASURE test-bed demonstration. However, other radios that provides software controllability may be used. For ASURE, the WIN-T LAW radios operated in the PMP mode. The WIN-T LAW radios were designed such that it is possible to control their parameters using network/application level SNMP messages that can read and write the radio MIB objects.

The ASURE system 600 used a Commercial Off-the-Shelf (COTS) part for the RF collectors 604. This RF collector 604 is essentially a tuner and a digitizer that is capable of providing real and imaginary (IQ) waveform samples collected in a particular band of interest to the spectrum sensing algorithms which then determine the nature of the signals present in these channels. The spectrum sensing module (SSM) is comprised of the RF collector 604 connected to the spectrum sensing algorithms running in a corresponding laptop 611.

The RF collector 604 and its corresponding radio 608 are connected via a network switch 620 to a corresponding laptop 611, which runs various software programs related to C&M, SM and spectrum sensing. In the future, it is envisioned that all these software routines may run either on the radios 608 or some other dedicated hardware.

While testing the ASURE system 600, a dynamic interference environment 30, was created by transmitting various types of waveforms using a signal generator, capable of operating in the frequency bands where the radios operate. Another WIN-T network was also used to create a network co-existence scenario.

The ASURE system 600 showed that it is possible to demonstrate cognitive networking capability without having a sensor 504 at every node. Application level messaging enabled through IP and SNMP where used for spectrum monitoring, network management and radio control. The cognitive engine was can be written in a high level language such as JAVA™ to provide for easy modification. The ASURE system 600 demonstrated the performance of such a DSA-enabled WIN-T LAW radio network operating in the presence of friendly and un-friendly mobile interference. The ASURE system 600 and algorithms where designed such that they can operate with practically any radio system, as long as such a radio system provides the necessary interfaces (e.g., hardware interface in the form of serial or ethernet ports and Management Information Base—MIBs) for controlling and monitoring the radios.

As discussed further below, the ASURE demonstration was carried out at the Fort Dix facility of the US Army CERDEC. The ASURE demonstration showed that it is possible to incorporate autonomous and advanced spectrum agility using non-DSA equipped military radios, while maintaining real-time system connectivity and link quality in the presence of dynamic interference environments.

Figure 7:
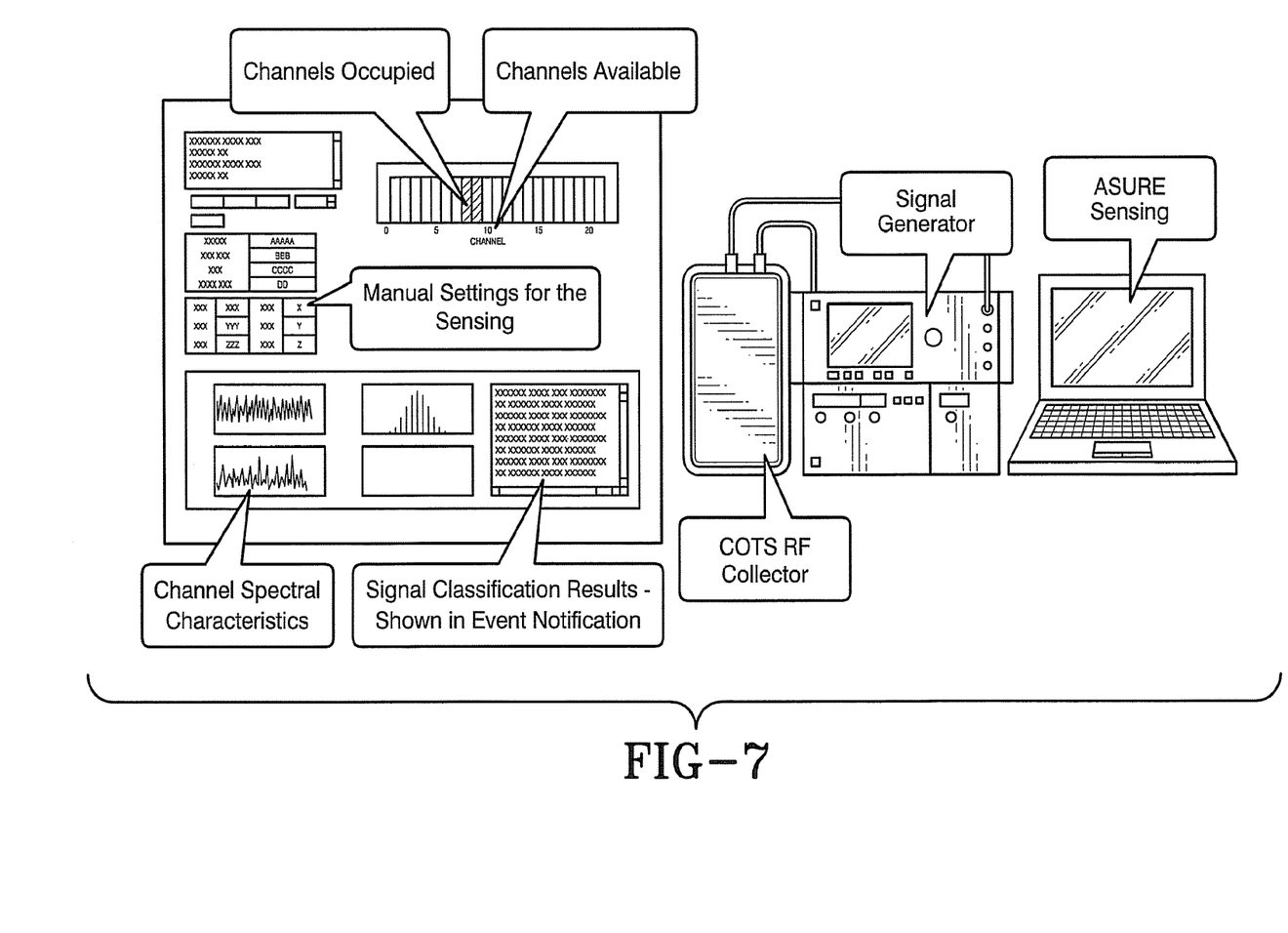
FIG. 7 illustrates one embodiment of a spectrum sensing module (SSM) associated with the preferred embodiment of a cognitive radio system.

FIG. 7 Illustrates the ASURE SSM. The SSM is comprised of the COTS RF collector 604 which is connected over an Ethernet cable to a computer 611 running custom designed spectrum sensing algorithms. Together these components form the SSM. The COTS RF collector part is a moderate cost wideband RF receiver with frequency coverage from 20 MHz to 5.9 GHz, digital Intermediate Frequency (IF) BW of 20 MHz, transmission control protocol (TCP) network interface, capture memory buffer of 512 MB, optional integrated precision global positioning system (GPS) receiver with high precision clock synchronization via GPS or network interface (e.g. IEEE 1588). COTS part related dynamic link libraries (DLLs) may be downloaded to control the hardware and extract real time information from it.

Use of a low noise pre-amplifier (LNA) is highly recommended at the front end of the COTS RF collector to reduce the effective noise figure (NF) and improve the sensitivity. Two modes are defined for the SSM operation. In autonomous mode, the SSM is given a frequency range to scan for, and it provides periodic reports to the SM on where signals have been detected and which frequencies are available. In this mode of operation, the SSM does not perform signal classification for the detected signals. Some of the measurements that are reported to the SM include, reports on the frequency channels that are available and their aggregate power spectral density. These measurements are then used to prioritize the backup channels, in case the radio needs to move from its current operating channel. The SSM can also be operated in a client/server configuration, where the SM can ask the SSM to scan a specific channel to confirm the presence of a detected signal and to classify it. This signal classification information is then used to either make a more informed decision at the SM or is passed on to the higher layers such as network operations (NetOps) where this information may be used for spectrum planning and policy.

The SSM can use custom designed feature based spectrum sensing algorithms based on higher order statistics (HOS) and cyclostationary features. Energy based signal detection is also available however, it may not used extensively due to the security concerns.

Figure 8:
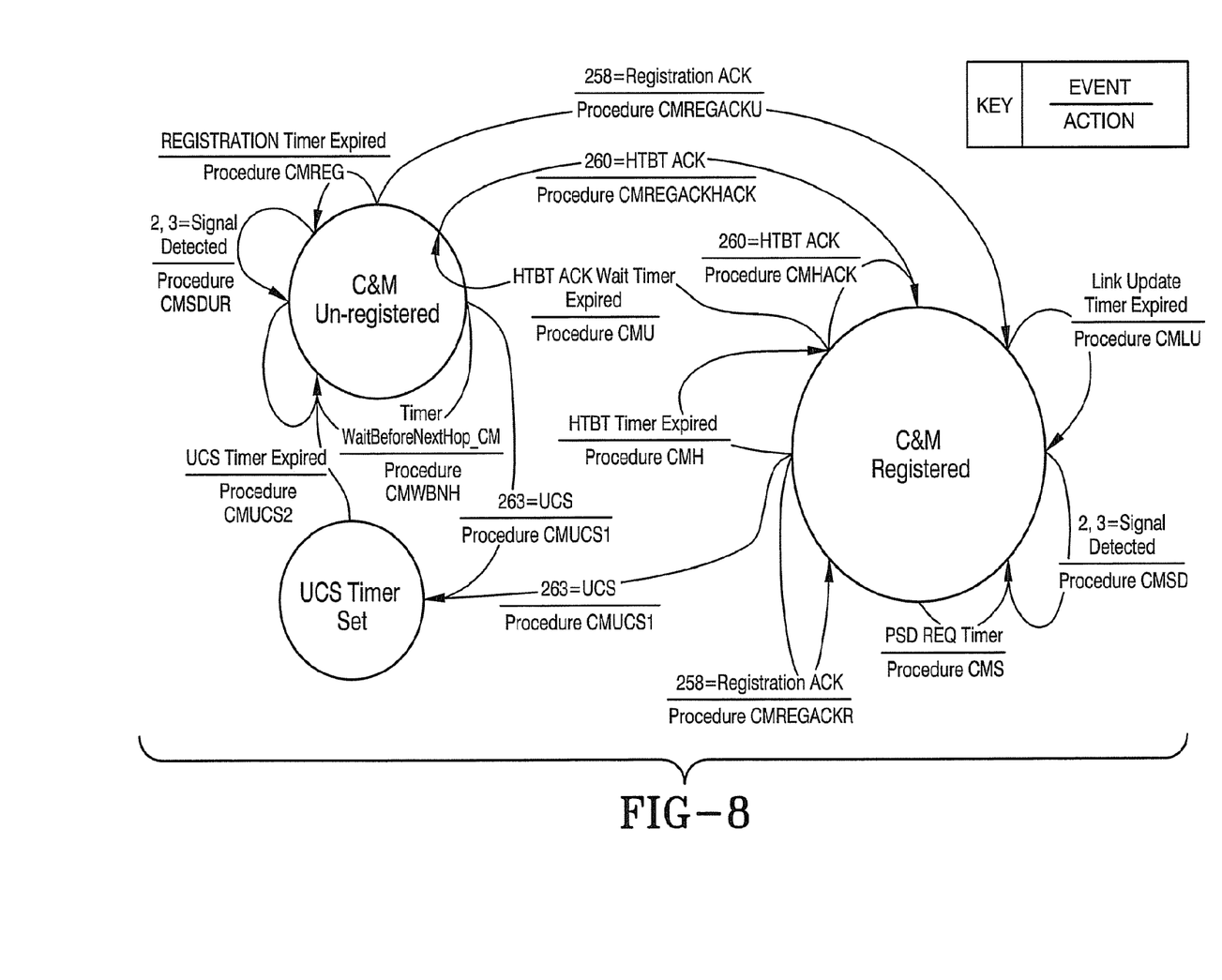
FIG. 8 illustrates one embodiment of an example state machine of the configuration and monitoring (C&M) logic associated with the preferred embodiment of a cognitive radio system.

FIG. 8 illustrates the ASURE configuration and monitoring (C&M) logic state machine diagram. Each flow on the state machine diagram is represented by a tuple of (event/action) which specifies the action taken in response to a particular event that has occurred. The numbers on the events indicate the ASURE Message IDs.

The C&M logic can be coded in JAVA™ and may reside in each of the nodes, interfacing the SSM and the radio. The C&M acts as a link between each of the nodes and the SM. The C&M contains the software for monitoring and controlling the radio and the SSM. The C&M also can contain local intelligence and decision making capabilities.

The C&M logic periodically fetches spectrum sensing information from the SSM. In case of any changes to previously recorded information that resides in its local memory, it transmits this information to the SM. The C&M also monitors the radio link parameters such as a received signal strength indicator (RSSI), the carrier to Interference plus noise ratio (CINR), a modulation and coding format and a packet error rate (PER) of the radios for every flow going in and out of the node. The C&M sends this information periodically to the SM. In case of sudden changes to any of these parameters, it is capable of sending urgent link update message to the SM, where the SM decides if a change in frequency, BW or power are required.

The C&M logic can also absorb the management and control commands from the SM and act on them. These requests are of various types such as SSM configuration, radio re-configuration for channel move, specific sensing request etc. The radio re-configuration request from SM instructs the C&M logic to re-configure the radio parameters such as frequency of operation, bandwidth, power etc. which allows radios to circumvent the dynamic interference environment. The C&M logic can also be responsible for executing a rendezvous, in case the link to the SM is lost.

Figure 9:
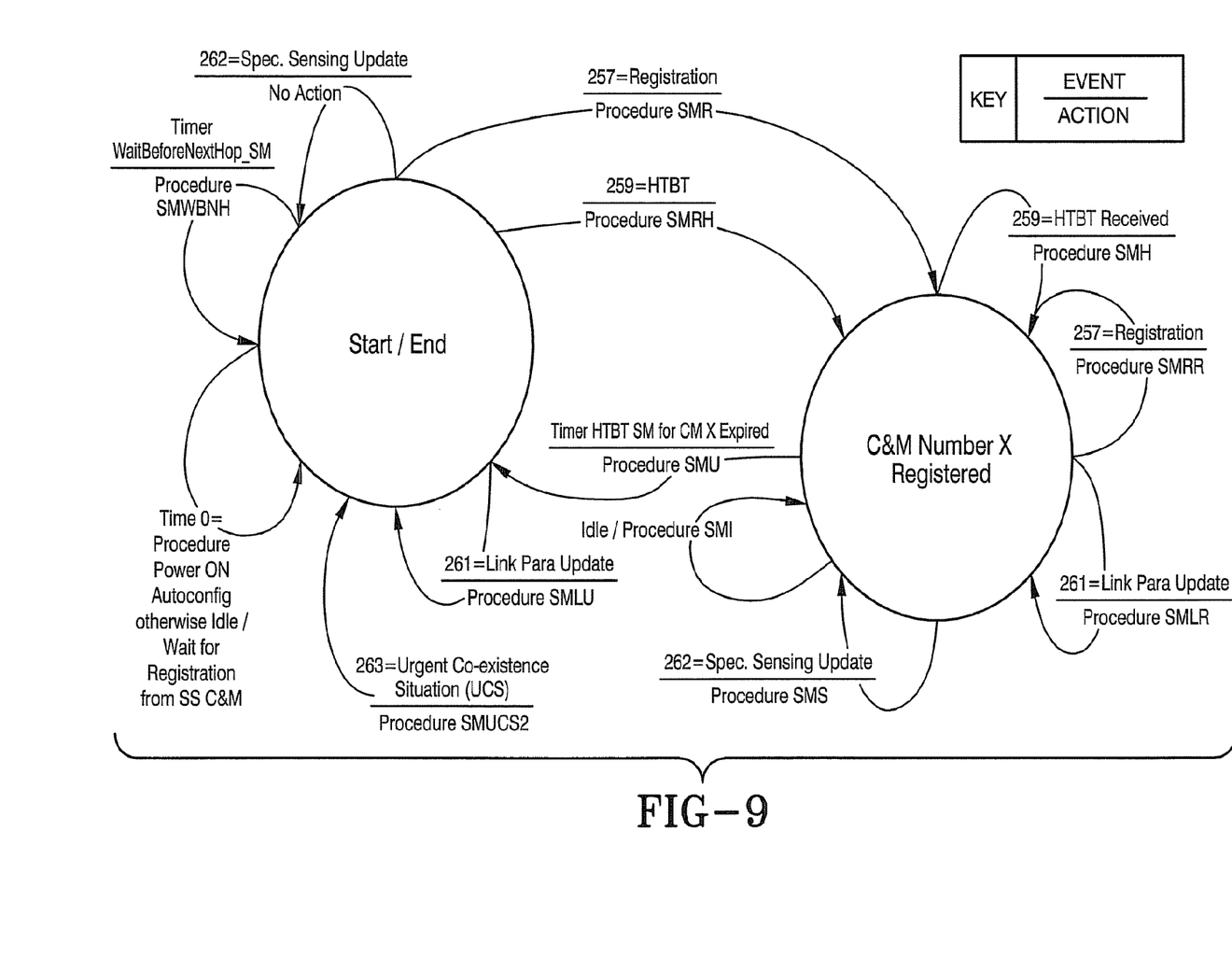
FIG. 9 illustrates one embodiment of an example state machine of the Spectrum Manager (SM) associated with the preferred embodiment of a cognitive radio system.

FIG. 9 illustrates the ASURE cognitive engine (spectrum manager) operation as a state machine diagram. The ASURE cognitive engine is also called as the Spectrum Manager (SM) that was discussed above. Since the SM is addressed by its unique IP address, it is possible for the SM to reside in nearly any part/module of the network.

The SM is responsible for absorbing the local sensing and link parameter information from each of the nodes and making a decision whether change in the radio network parameters such as frequency, BW or power are required. The ASURE capability of allowing the change in the radio operating frequency as well as BW allows Gray space utilization and provides greater agility to the network. Future versions of the SM may be provided with an interface to the NetOps.

The SM keeps track of the sensing information from the various SSMs and uses this information to pre-compute the backup channel configuration. The backup channel configuration is computed as a tuple of frequency, bandwidth, transmit power. The SM at any time pre-computes up to three backup channels and transmits this information to all the nodes periodically.

When a signal is detected on a particular channel, the SM has a capability to further investigate it by asking the sensing algorithms to classify the signal type and report back. Based on this information, the SM makes a decision on whether the detected signal is authentic and whether the channel is available for operation. The SM may also be capable of transmitting this information to the NetOps in order to facilitate the spectrum planning decision.

The SM keeps track of C&Ms that have registered with it. The SM has the intelligence to reason, if a connection was broken because of interference or if it was broken because of poor link margin. In cases when the link is about to go down due to interference, a command for a network move is issued before the link is lost completely asking all the registered C&Ms to move to the first available backup channel. In cases when such a call does not go through, and the link to the SM is lost for more than a certain amount of time, the C&Ms have the local intelligence to move to the first backup channel. In situations where no backup channels are available, the C&M initiates a rendezvous algorithm to try and synchronize with the SM. The rendezvous algorithm becomes complicated when some of the nodes do not have a local sensor, as is the case for the ASURE system. This is because the computed backup channels may not be optimal for the nodes without a sensor (as no local sensing information is provided to the SM).

Figure 10:
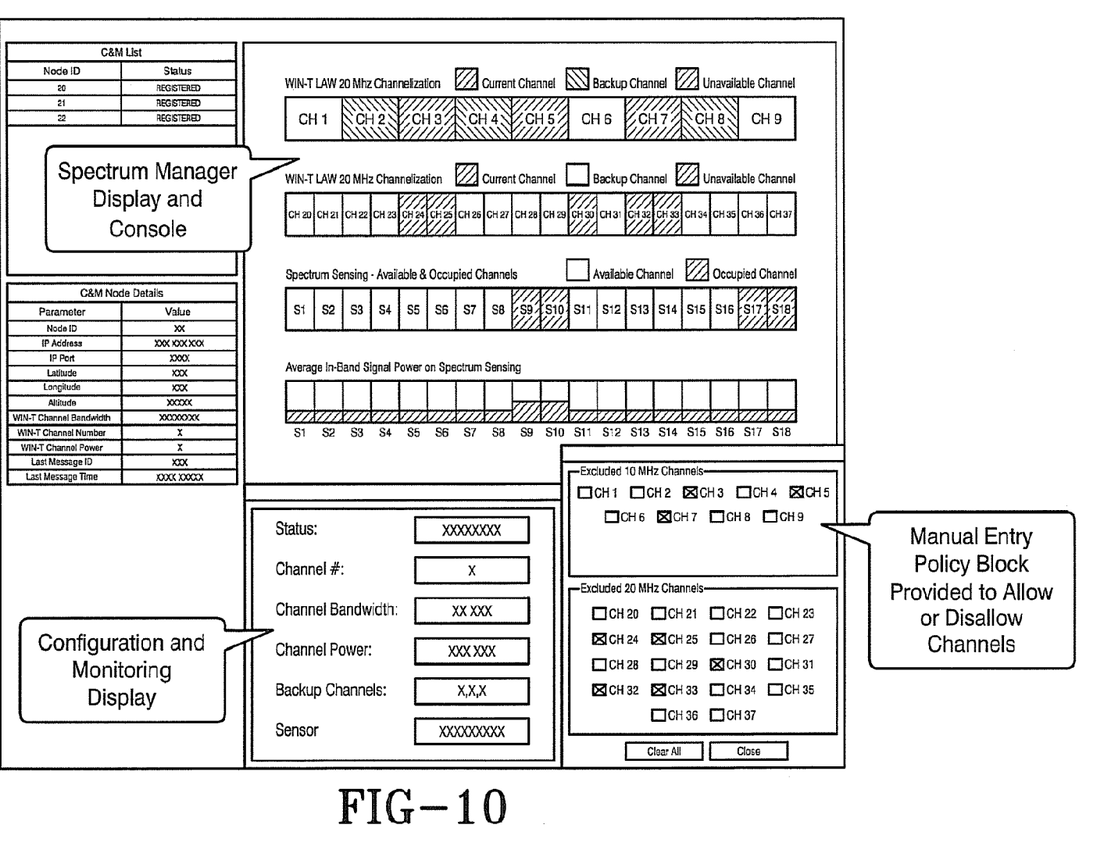
FIG. 10 illustrates one embodiment an SM display console associated with the preferred embodiment of a cognitive radio system.

FIG. 10 illustrates the SM display console demonstrating how the information fusion takes place from various nodes to the SM. The display can use a dark blue color to represent the 'current operating channel,' the display can use a light blue color to represents the 'backup channels'. The display can use a red color to represent the 'disallowed' channels as specified by the policy. The policy block at this time is defined using manual entries by the users, but in future versions of ASURE it is envisioned that this information will be provided by the upper echelons as a part of the NetOps. The third row shows the fusion of the sensing information from various SSMs. Light green color can be used to represent channels where no signal has been detected and that are 'available' for radios to operate on. Red color can represent channels where some signals (either a friendly network or some other interfering signals) were detected and hence they are 'disallowed' from use. The last row can be represented in violet to indicate the aggregate power spectrum densities (PSDs) of the channels. Aggregate PSD is defined in Equation 1 as $$PSD_{Aggregate} = \frac{1}{N \cdot K} \sum_n \sum_k |X_{k,n}|^2 \qquad \text{Equation 1}$$
$$k = 0, \ldots, K-1,$$

where $X_k$ is the Fourier transform of the captured signals for a particular channel, k is the Fourier co-efficient and n represents the PSD information coming from a particular node. N and K represent the total number of nodes that have sensing capability and length of the Fourier transform respectively. The aggregate PSD is proportional to the sum of the powers of all the signals and the noise contained in that particular channel. It is to be noted that when no information bearing signal is detected for a particular channel, the aggregate PSD is a measure of total amount of interference plus the noise contained in it. Note that the Shannon capacity is defined by Equation 2, $$C = BW \cdot \log_2\left(1 + \frac{S}{I+N}\right) \approx BW \cdot \log_2\left(1 + \frac{S}{PSD_{Aggregate}}\right) \qquad \text{Equation 2}$$

where C is the information rate, S is the signal power, BW is the Bandwidth, and (I+N) is the total interference plus the noise power. For all the 'available' channels, where no signals are detected based on feature based sensing algorithms, the aggregate PSD is proportional to the interference plus the noise power. Hence the capacity, C, for a given fixed transmit power S is maximized by choosing a channel with lowest aggregate PSD. This logic is can be used to prioritize the backup channels.

Figure 11:
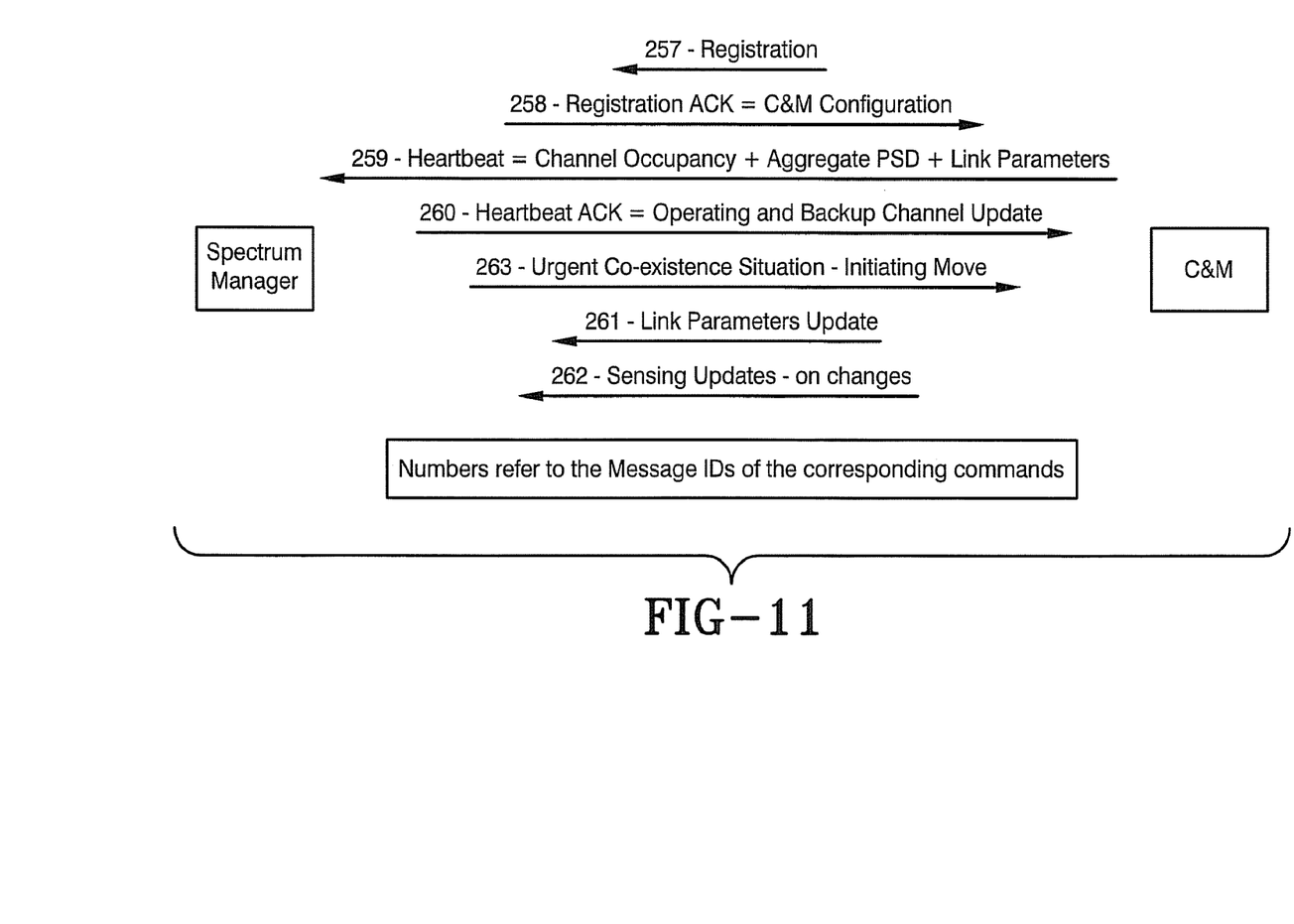
FIG. 11 illustrates examples of application level messaging between the SM and C&M.

The application level messaging of the ASURE system 600 will now be discussed. An extensive library of messages was defined for the ASURE system. FIG. 11 illustrates some of the messages that are exchanged between the C&Ms and the SM. The Registration message (MSG ID 257) is sent by the C&M to the SM, when it first tries to register with the SM. In response to the Registration, the SM sends Registration Acknowledgement message (Message ID 258) which also contains the configuration information for the C&M, the SSM and the radio.

Once the registration is complete, the C&M sends Heartbeat message (Message ID 259) to the SM, periodically. The Heartbeat contains the channel occupancy, aggregate PSD and link parameters information for every flow through the node. In response to the Heartbeat message, the SM sends out the Heartbeat ACK message (Message ID 260) to the C&M, which contains the operating and backup channel information. Message ID 263 represents the Urgent Co-existence Situation message that commands all the C&Ms to move to the backup channel. Message IDs 261 and 262 contain urgent link update information and signal classification information respectively.

The ASURE field demonstration was carried out at the Fort Dix facility of Communications-Electronics Research, Development, and Engineering Center (CERDEC). Fort Dix has been uniquely laid out by Product Manager of Command, Control, Communications, Computers, Intelligence, Surveillance and Reconnaissance on the move (PM C4ISR OTM) to test and evaluate next generation on the move technologies.

The ASURE demo consisted of three nodes operating in a point to multi-point (PMP) network topology. One of the nodes did not contain the SSM. This demonstrates that not all the nodes in a cognitive radio network require spectrum sensing capability.

Interference was created using a COTS Agilent signal generator emanating certain non-information bearing waveforms within the frequency range of operation of the radios. Another static WIN-T LAW radio network was also made to operate in the vicinity. A variety of tests were carried out to measure the ability of the ASURE network to operate in a dynamic interference environment. These tests consisted of testing the time to abandon the channel once the interference was detected, the time taken to re-establish the network on another channel, and system overhead due to all the cognitive messaging. These measured parameters have been listed in Table 1:

TABLE 1

| Performance Parameter: | Description: | Performance Value: |
| --- | --- | --- |
| Network reestablishment time | Time from when radios are asked to move to the time when the subscribers are REGISTERED on the new backup channel | 0.62 s where 0.50 s is the Wait Before Hop Time |
| Interference response time/channel abandonment time | Time from when the interference is detected to the time when the radios are asked to move. | <0.80 s (with the urgent link update) <1.68 (without urgent link update) |
| Total cognitive messaging overhead | Average system overhead for all cognitive messaging in the Downlink and the Uplink | 1.85 kbits/s/link (amounts to 0.0185% overhead assuming 10 MBits/s link) |
| Overhead—DL | Average system overhead for all the cognitive messaging in the Downlink | 0.49 Kbits/s/link |
| Overhead—UL | Average system overhead for all the cognitive messaging in the Uplink | 1.36 Kbits/s/link |

The results in Table 1 show that it is possible to make the current non-DSA military radios 'cognitive' without making hardware or firmware modifications to them. The table also shows that the system works in spite of not having a sensor at every node. The network re-establishment and the channel abandonment times are quite small, in spite of the application level messaging, and can be improved in many ways. Finally, adding cognitive messaging at the application level does not add significant penalty to the system throughput. The cognitive messaging overhead and timing are likely to increase linearly with the number of nodes in the system, however, some preliminary investigation has shown that the overhead per node can be substantially reduced by eliminating redundancy in the messaging that was incorporated to ensure robust operation in the dynamic interference environments.

This demonstration of this invention showed that it is possible to incorporate autonomous and advanced spectrum agility using non-DSA equipped military radio while maintaining real-time system connectivity and link quality in the presence of dynamic interference environments.

Example methods may be better appreciated with reference to flow diagrams and/or state machine diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 12:
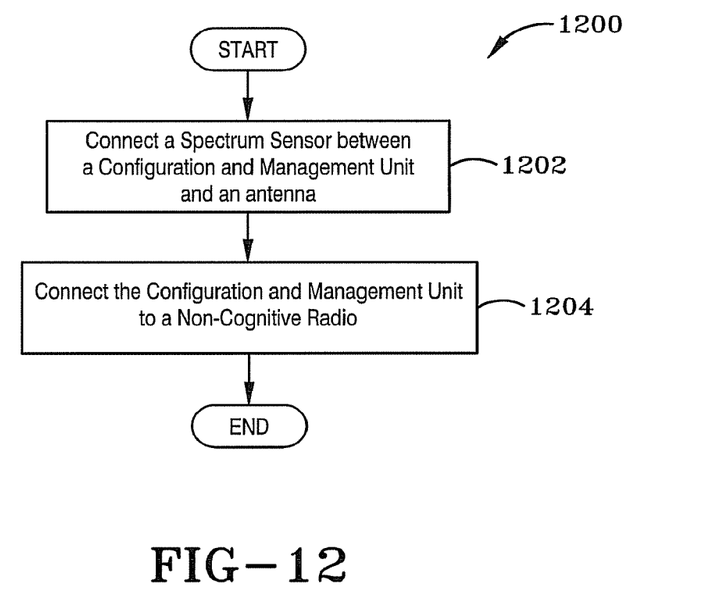
FIG. 12 illustrates the preferred embodiment configured as a method of converting a non-cognitive radio into a cognitive radio.

FIG. 12 illustrates a method 1200 of the preferred embodiment that is a method of convert a non-cognitive radio in a cognitive radio. The method 1200 connects a spectrum sensor between a configuration and management unit and an antenna, at 1202. The spectrum sensor senses a wireless environment to determine available frequencies and/or available channels. The method 1200 connects the configuration and management unit to a non-cognitive radio, at 1204. The configuration and management unit transmits the available frequencies and/or available channels to a remote spectrum manager that is managing access to a wireless network. The configuration and management can communicate with a remote spectrum manager in the application level of the ISO model. The method 1200 can additionally operate this radio as a cognitive radio according to the International Electrical and Electronic Engineers Institute (IEEE) 802.22 standard. The spectrum sensor and the configuration and management unit are removable from the non-cognitive radio to allow the radio to operate as a non-cognitive radio.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

What is claimed is:

1. A method comprising:
   connecting a spectrum sensor between a configuration and management unit and an antenna, wherein the spectrum sensor senses a wireless environment to determine at least one of: available frequencies and available channels;
   connecting the configuration and management unit to a non-cognitive radio; and
   installing configuration and management software inside the non-cognitive radio;
   wherein the configuration and management unit, the configuration and management software and the spectrum sensor convert the non-cognitive radio into a cognitive radio;
   wherein the configuration and management unit is configured to transmit to a remote spectrum manager that is managing access to a wireless network at least one of: the available frequencies and available channels; and
   wherein the spectrum sensor and the configuration and management unit are physically removable from the non-cognitive radio; and further comprising:

using mode logic of the configuration and management unit to determine when to place the cognitive radio in an autonomous mode and when to place the cognitive radio in a client/server mode with the cognitive radio acting as a client to the remote spectrum manager that acts as a server, wherein in the autonomous mode the configuration and management unit is configured to scan a specified frequency range and provide periodic reports to the spectrum manager about at least one of: spectral density, available frequencies and available channels.

2. The method of claim 1 further comprising:
connecting an electronic device to the non-cognitive radio that has been converted into a cognitive radio to allow the electronic device to transmit and receive messages over the wireless network.

3. The method of claim 1 wherein the configuration and management unit communicates with a remote spectrum manager in the application level of the Open Systems Interconnection (OSI) model.

4. The method of claim 3 further comprising:
transmitting from the configuration and management unit to the remote spectrum manager in the application level at least one of: the available frequencies and available channels.

5. The method of claim 1 further comprising:
removing the antenna from the non-cognitive radio.

6. The method of claim 5 further comprising:
operating the non-cognitive radio in the wireless network in a non-cognitive mode.

7. The method of claim 1 further comprising:
displaying on a graphical user interface (GUI) spectral data collected from the spectrum sensor.

8. The method of claim 7 further comprising:
accepting and applying operating settings for the spectrum sensor through the GUI.

9. The method of claim 1 further comprising:
determining with the spectrum sensor at least one spectrum characteristic of a spectrum based on at least one of: higher order statistics (HOS) of the spectrum and cyclostationary features of the spectrum.

10. The method of claim 1 further comprising:
operating the cognitive radio according to the Institute of Electrical and Electronic Engineers (IEEE) 802.22 standard.

* * * * *